(12) United States Patent  
Shibamori et al.

(10) Patent No.: US 8,847,745 B2  
(45) Date of Patent: Sep. 30, 2014

(54) DISPLAY SYSTEM FOR WORKING MACHINE

(75) Inventors: Kazuhiro Shibamori, Joso (JP); Yutaka Watanabe, Tsuchiura (JP); Hidenobu Tsukada, Ushiku (JP); Keiichiro Nakamura, Mito (JP); Yuuki Gotou, Tsuchiura (JP); Kouta Fujieda, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/818,874

(22) PCT Filed: Sep. 29, 2011

(86) PCT No.: PCT/JP2011/072316
§ 371 (c)(1),
(2), (4) Date: Feb. 25, 2013

(87) PCT Pub. No.: WO2012/043691
PCT Pub. Date: Apr. 5, 2012

(65) Prior Publication Data
US 2013/0176120 A1    Jul. 11, 2013

(30) Foreign Application Priority Data

Sep. 29, 2010   (JP) ................................. 2010-219307

(51) Int. Cl.
*B60Q 1/00*  (2006.01)
*E02F 9/26*  (2006.01)
*G07C 5/08*  (2006.01)

(52) U.S. Cl.
CPC . *B60Q 1/00* (2013.01); *E02F 9/261* (2013.01); *G07C 5/0825* (2013.01); *E02F 9/267* (2013.01)
USPC ............................................ 340/438; 345/30

(58) Field of Classification Search
USPC .............................. 340/438; 345/30; 715/771
See application file for complete search history.

(56) References Cited

U.S. PATENT DOCUMENTS 5,442,541 A *  8/1995  Hube et al. ........................ 700/9
6,812,942 B2 * 11/2004  Ribak ............................. 345/30
7,683,805 B2 *  3/2010  Amano .......................... 340/935

FOREIGN PATENT DOCUMENTS

| JP | 10-076868 A | 3/1998 |
| JP | 11-081393 A | 3/1999 |
| JP | 3293762 B2 | 4/2002 |
| JP | 2006-088971 A | 4/2006 |

* cited by examiner

*Primary Examiner* — John A Tweel, Jr.
(74) *Attorney, Agent, or Firm* — Mattingly & Malur, PC

(57) ABSTRACT

A display system for a working machine displays basic information at all times and, in case of an abnormality, displays the details of the warning in addition to the basic information to enable an operator to reliably recognize details of the warning. For example, a first warning display function, upon receiving an abnormality information signal relating to a charge warning, displays an appropriate warning icon in a warning icon display region. A simplified basic-information display function, then displays simplified basic-information images and a second warning display function displays, in a free area of the display, a second warning message inclusive of a "Charge warning" message as display details of the warning icon, and of character information relating to a simplified remedial action. The operator can then reliably recognize the "Charge warning" and understand its details as well, by viewing the second warning message in addition to the warning icon.

7 Claims, 11 Drawing Sheets

US 8,847,745 B2

DISPLAY SYSTEM FOR WORKING MACHINE

TECHNICAL FIELD

The present invention relates to a display system for working machines, disposed in a cabin of a working machine such as a hydraulic excavator, for making an operator recognize various information.

BACKGROUND ART

Inside a cabin of a hydraulic excavator such as a working machine, various kinds of instruments are provided to enable an operator to confirm basic information on a vehicle body state of the hydraulic excavator. These kinds of instruments include, for example, a coolant temperature indicator, a working oil temperature indicator, a residual available fuel level indicator, and an engine speed indicator. An hour-meter that indicates an elapsed total operation time of the hydraulic excavator, an instrument that indicates information on the selector position of a gate lock lever, and other information indicators may also be provided as appropriate.

In recent years, various information on a specific hydraulic excavator, including the information that the above-mentioned instruments acquire, has come to be displayed collectively on a display monitor such as a liquid-crystal display. During normal vehicle operation, a temperature of a coolant, a residual available fuel level, and other basic information on the vehicle body state are displayed on such a monitor. However, for example if an abnormality occurs in the hydraulic excavator, warning information on the occurrence of the abnormality, the kind and details thereof, a necessary remedial action against the abnormality, and the like, needs to be displayed to notify the abnormality to an operator.

Additionally, since a sufficient rearward vision cannot be ensured for the operator who operates the machine from the cabin, the hydraulic excavator may have a supervisory camera at a rear position thereof to display a camera image on the monitor. This ensures the operator's auxiliary rear visibility, enabling safe working.

It is preferable that such a monitor be as compact as possible to ensure the operator's view. In addition, the volume of information to be displayed tends to increase with the functional diversification of hydraulic excavators in recent years. It is therefore necessary for the monitor to display a larger volume of information more efficiently in a limited display region.

In other words, while basic information needs to be displayed at all times, warning information does not need to be displayed in usual operation. But in case of an abnormality, it is necessary to make such a display that the operator can reliably recognize warning information. At the same time, the two kinds of information needs to be switched and displayed in an efficient manner.

Patent Document 1 discloses two techniques as prior art for displaying basic information under a normal state and warning information under an abnormal state. The first of the two techniques is designed so that a warning icon is activated in case of an abnormality and so that the display of the basic information is switched to that of character information relating to details of the warning icon. The second of the two techniques is designed so that in case of an abnormality, character information relating to details of a warning icon is displayed in overlapped form on the basic information.

PRIOR ART DOCUMENTS

Patent Documents

Patent Document 1: Japanese Patent No. 3293762

SUMMARY OF THE INVENTION

Problems to be Solved by the Invention

The warning icon in the first prior art is effective in that the warning icon is displayed in a narrow display region so that an operator can intuitively recognize the icon. However, merely by looking at the warning icon, the operator will not necessarily be able to understand the details of the icon, that is, what the icon means. To make the meaning of the warning icon understandable, therefore, it is necessary that the character information relating to the details of the icon be displayed by switching the display of the basic information to that of the character information.

Automatic switching display, however, is not preferable since, if the timing of automatic switching is not what the operator intends, the operator will be unable to confirm the necessary basic information, so that his/her original machine-handling work is likely to be affected. Manual switching display is not preferable, either, since this forces the operator to perform switching operations during machine handling and is therefore likely to reduce his/her concentration.

Displaying the warning information (warning details) in overlapped form on the basic information, as in the second prior art, means that the basic information is displayed at all times, which enables the operator to understand the details of the warning as well as to confirm the basic information. Such overlapped display, however, has a problem of the basic information being impaired in the operator's visibility if the overlapped region slightly decreases in image quality.

An object of the present invention is to provide a display system for a working machine, adapted to display basic information at all times and to display, in case of an abnormality, details of a warning in addition to the basic information efficiently and in such a form as to enable an operator to reliably recognize the details of the warning.

Means for Solving the Problems (1) In order to attain the above object, the display system for a working machine according to an aspect of the present invention includes: a monitor including a basic information display region for displaying images relating to basic information on the working machine, and a warning icon display region for displaying a warning icon; and a display controller having a basic information display function for displaying the images relating to the basic information, and a first warning display function for displaying the warning icon. The display controller further includes a simplified basic-information display function using a predetermined signal to newly display, instead of the images relating to the basic information, simplified basic-information images smaller than the basic-information images, and a second warning display function for displaying warning information inclusive of the display details of the warning icon, in an area within the basic information display region, the area within the basic information display region corresponding to an area other than an area in which the simplified basic-information images are displayed.

(2) Preferably, the display system in above item (1) further includes abnormality detection means for detecting an abnormality of the working machine. The predetermined signal is an abnormality detection signal obtained from the abnormality detection means.

Warning icons are effective in that they are displayed in a narrow display region so that an operator can intuitively recognize each warning icon. However, merely by looking at the warning icon, the operator will not necessarily be able to understand details of the icon, that is, what the icon means. To make the meaning of the warning icon understandable, therefore, it is necessary to display character information relating to the details of the icon. Although automatic switching display, manual switching display, and overlapped display are disclosed in the prior art, all of these display methods have had problems in that the basic information cannot be confirmed or is awkward to confirm, or in that operations are troublesome.

In the display system of the present invention, as opposed to the above, a simplified basic-information display function displays a simplified basic-information image and a second warning display function displays warning information including a warning icon's display details. The warning information is displayed in a free (unoccupied) area within a basic information display region, the free (unoccupied) area within the basic information display region corresponding to an area other than an area in which the simplified basic-information image is displayed. By viewing the warning information, therefore, the operator can reliably recognize existence of the warning information and understand display details of this information as well.

At this time, the problems that the basic information cannot be confirmed or is bothersome to confirm or that operations are troublesome do not occur. Hence, the display system can display the basic information at all times, and in case of the abnormality, can display the details of the warning in addition to the basic information in such form as to enable the operator to reliably recognize the details of the warning.

In addition, since the second warning display function displays the warning information in a free (unoccupied) area, a larger volume of information can be displayed efficiently in a limited display region.

(3) The display system in above item (2) is preferably configured to further include an importance level determining means for determining an importance level of the abnormality information relating to the abnormality detection signal. The simplified basic-information display function and the second warning display function operate if the abnormality relating to the abnormality detection signal is serious.

Accordingly, if the abnormality is minor, the simplified basic-information display function and the second warning display function do not operate and the display of the basic-information image continues, which avoids the troublesomeness of display switching.

(4) The display system in item (1) is preferably configured to further include a camera for acquiring an image of the periphery of the working machine. The monitor further includes a camera image display region for displaying the camera image obtained from the camera. The display controller further has a camera image display function.

(5) The display system in above item (4) is preferably configured to further include no-operations state detection means for detecting a no-operations state of the working machine. The display controller further include a third warning display function for displaying, in the camera image display region, information based upon a no-operations state detection signal obtained from the no-operations state detection means, the signal-based information being pertinent to the warning information.

The detection of the no-operations state ensures safety, even if the camera image is erased. The third warning display function can therefore display the information pertinent to the warning information in the camera image display region. The operator can more reliably recognize the warning information by viewing the pertinent information.

In addition, since the third warning display function displays the pertinent information in the camera image display region, an even larger volume of information can be displayed efficiently in a limited display region.

(6) In item (1), preferably, the warning icon display region is adapted to display a plurality of warning icons. The first warning display function displays the plurality of warning icons, side by side, according to the level of importance.

(7) The display system in above item (6) is preferably configured to further include a rotary switch for selecting a warning icon by rotation and determine the selected warning icon upon the switch being pressed. The second warning display function displays warning information that includes display details of the warning icon determined using the rotary switch.

Effects of the Invention

In accordance with the present invention, basic information is displayed at all times, and in case of an abnormality, details of a warning are displayed in addition to the basic information in a form that enables an operator to reliably recognize the details of the warning. In addition, the basic information and the warning details are displayed efficiently.

MODE FOR CARRYING OUT THE INVENTION

Figure 1:
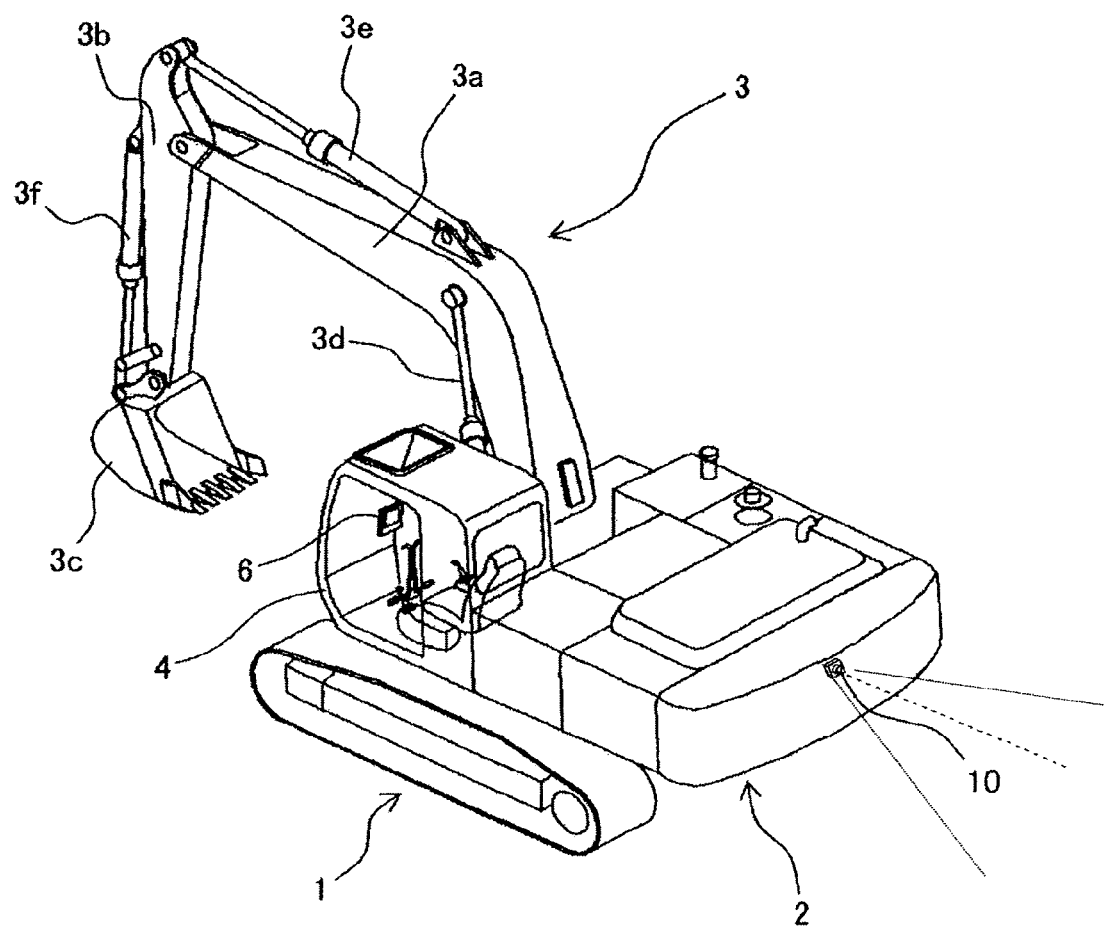
FIG. 1 is an external view of a hydraulic excavator.

Hereunder, an embodiment of the present invention will be described referring to the accompanying drawings.
—Configurations—
FIG. 1 is an external view of a hydraulic excavator shown as an example of a construction machine according to an embodiment of the present invention. The hydraulic excavator substantially includes a crawler type of lower track structure 1, an upper swing structure 2 provided pivotally with respect to the lower track structure 1, and a front working implement 3 having excavation work means and the like.

The lower track structure 1 has left and right traveling motors (not shown), which drive crawlers to rotate to make the vehicle (hydraulic excavator) travel forward or backward. The upper swing structure 2 includes a cabin 4 in which an operating device and other elements of the hydraulic excavator are arranged (for further details of the cabin 4, see FIG. 2 that follows). The upper swing structure 2 also includes a motive power generator (not shown) such as an engine, a swinging motor (not shown), and other elements. The swinging motor swings the upper swing structure 2 in a rightward or leftward direction relative to the lower track structure 1. The front working implement 3 includes a boom 3a, an arm 3b, and a bucket 3c, the boom 3a being actuated vertically by a boom cylinder 3d, the arm 3b being actuated to a dumping (opening) position or a crowding (scooping/raking) position by an arm cylinder 3e, and the bucket 3c being actuated to a dumping position or a crowding position by a bucket cylinder 3f.

In addition, a camera 10 for rearward supervisory purposes is also mounted on the counterweight of the hydraulic excavator in order not to create a blind area at the machine so that an operator can operate the excavator more safely and more efficiently.

Figure 2:
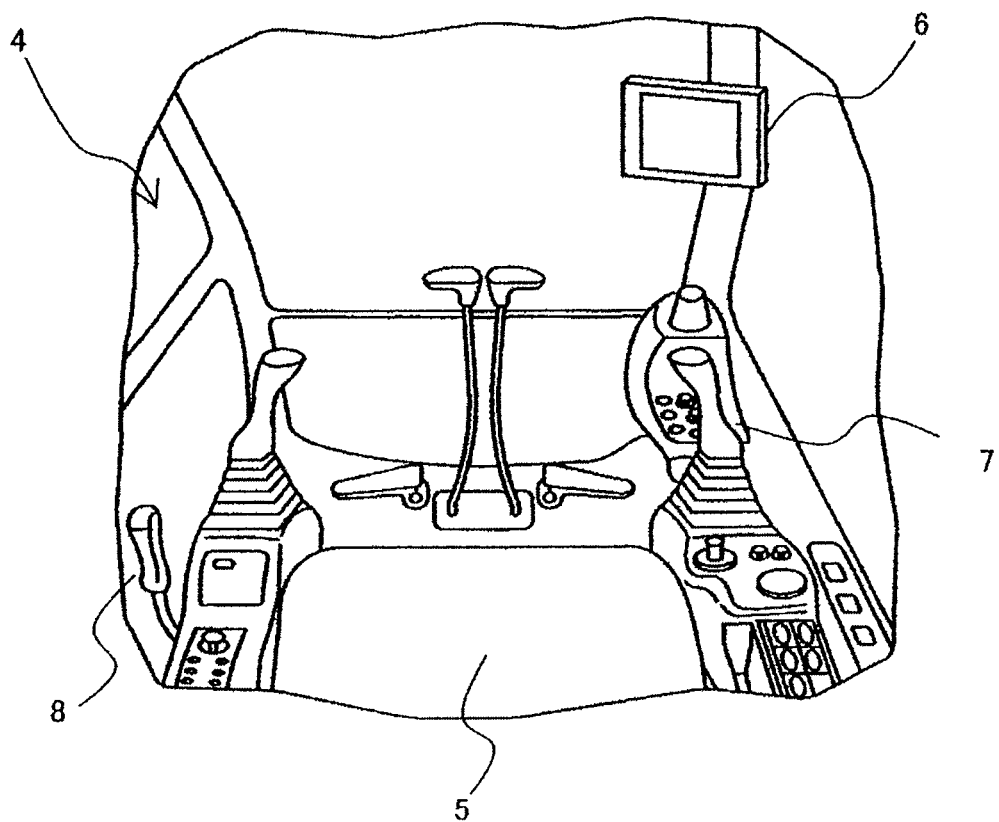
FIG. 2 is a schematic view showing a cabin interior of the hydraulic excavator.

FIG. 2 is a schematic view showing the interior of the cabin 4 of the hydraulic excavator. A driver's seat 5 on which the operator sits is provided inside the cabin 4, and a monitor 6 that displays various information sent from instruments relating to operational states of the hydraulic excavator (construction machine) is provided around the driver's seat. Around the driver's seat, the operating device 7 is also provided. The operating device 7 includes control levers and the like for the operator to perform such operations as making the lower track structure 1 travel, swinging the upper swing structure 2, and excavating soil with the front working implement 3.

The monitor 6 includes a liquid-crystal display screen for example, and during normal operation of the vehicle, displays basic information relating to states of the vehicle body that are detected by a coolant temperature indicator 31, an available-fuel level indicator 32, and other instruments. The monitor 6 also displays a camera image 33 (see FIG. 5). The monitor 6 is constituted by a monitor display section 6a and a monitor-operating section 6b (see FIG. 3 for these sections).

A gate lock lever 8 is provided at a front left-side portion of the driver's seat 5 (i.e., an entrance of the cabin 4). The gate lock lever 8 is selectively actuated to a lowering position for limiting the entrance of the driver's seat 5, and a raising position for opening the entrance of the driver's seat 5.

Figure 3:
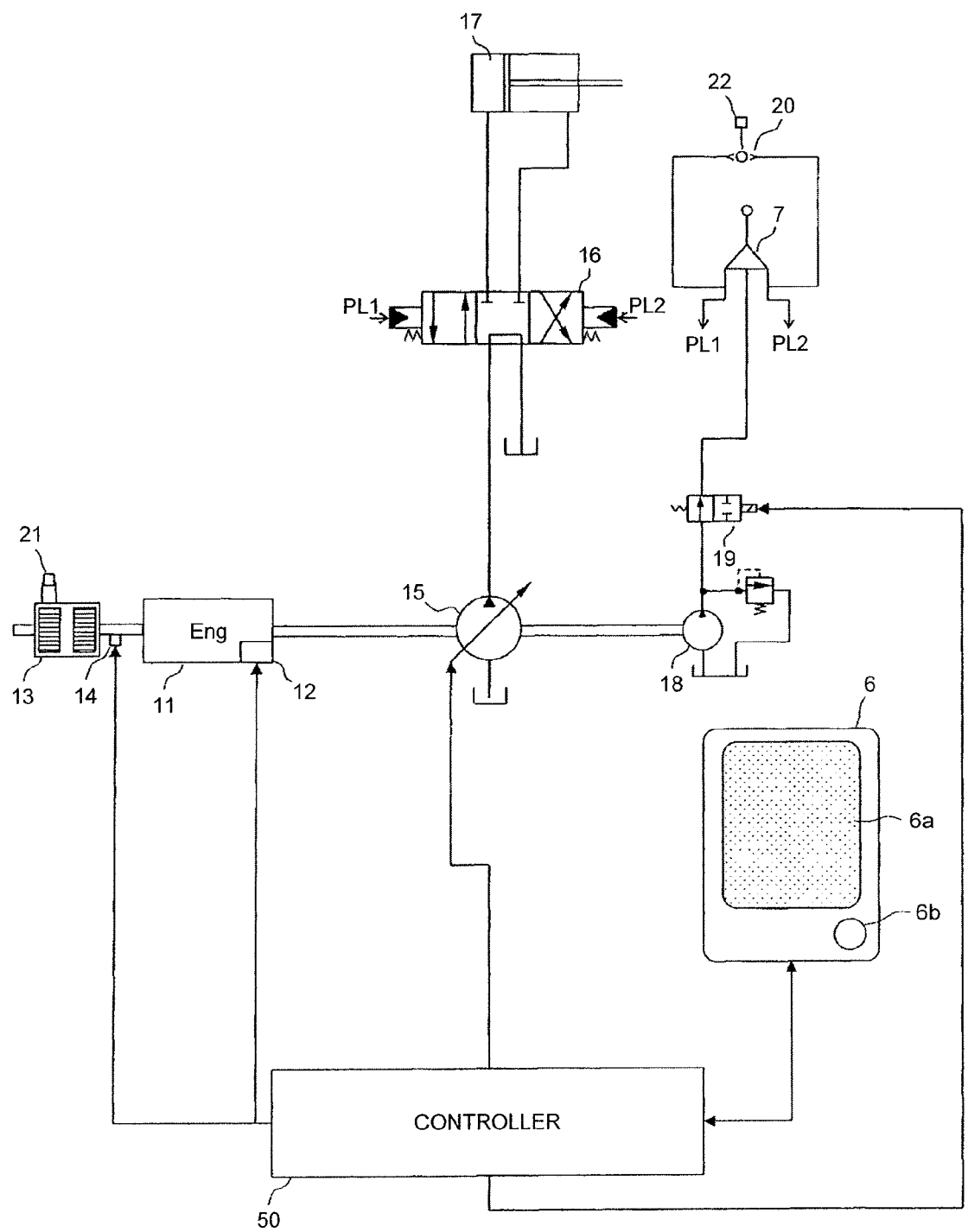
FIG. 3 is a diagram showing schematically a total system configuration of the hydraulic excavator, inclusive of a display system.

FIG. 3 is a diagram showing schematically a total system configuration of the hydraulic excavator, inclusive of a display system, an engine system, a hydraulic driving system, and an operating pilot system.

The hydraulic excavator uses the engine 11 to rotationally drive a hydraulic pump 15, uses a hydraulic fluid delivered from the hydraulic pump 15 to drive hydraulic actuators 17 such as the arm cylinder 3e, and thus conducts excavation and other necessary work.

The engine system includes the engine 11 and a fuel injector 12. A control unit 50 controls a rotating speed and output torque of the engine 11 by controlling the fuel injector 12 so that the engine 11 has its actual rotating speed matched to a target speed.

The engine 11 further has a diesel particulate filter (DPF) unit 13 on its exhaust line. The DPF unit 13 traps particulate matter emitted from the engine 11. A regenerative fuel injector 14 is provided between the engine 11 and the DPF unit 13. The regenerative fuel injector 14 boosts exhaust gas temperature by injecting fuel, to burn off the particulate matter accumulated on filter walls of the DPF unit 13. The control unit 50 conducts regenerative control of these elements.

The hydraulic driving system includes the hydraulic pump 15, a control valve 16, and the hydraulic actuators 17. The hydraulic pump 15 is rotationally driven by the engine 11 to deliver the hydraulic fluid. The control valve 16 controls direction and flow rate of the hydraulic fluid and supplies the hydraulic fluid to the hydraulic actuators 17. The hydraulic actuators 17 are thus driven.

The operating pilot system includes a pilot pump 18, the operating device 7, a control valve 19, a shuttle valve 20, and a pressure sensor 22. The engine 11 rotationally drives the pilot pump 18, thereby generating a primary pilot pressure. The operating device 7 generates pilot-operating pressures PL1 and PL2 based on its operating direction and operating stroke. The pilot-operating pressures PL1, PL2 are assigned to the control valve 16, thus switching an operating position of the control valve 16. The control valve 19, provided on a pilot line, has its ON/OFF state controlled depending on the raising/lowering position of the gate lock lever 8 (see FIG. 1). This enables the control valve 19 to generate the pilot-operating pressures and to cut off the primary pilot pressure. The shuttle valve 20 extracts a maximum pressure of the pilot-operating pressures and outputs the maximum pressure. The pressure sensor 22, connected to an output port of the shuttle valve 20, detects the maximum pressure that is the output pressure of the shuttle valve 20, and thereby detects whether operations are underway.

The display system transfers information from each system to the monitor 6 as display signals when necessary, and displays the information on the monitor display section 6a. The display system also functions as a graphical user interface (GUI) to transfer a command from the operator to the control unit 50 via the monitor-operating section 6b. The monitor-operating section 6b is, for example, a rotary switch, which has both a function of a rotary-type switch operated by rotation, and a function of a button-type switch turned on/off when pressed.

The control unit 50 controls each system.

—Control—

Figure 4:
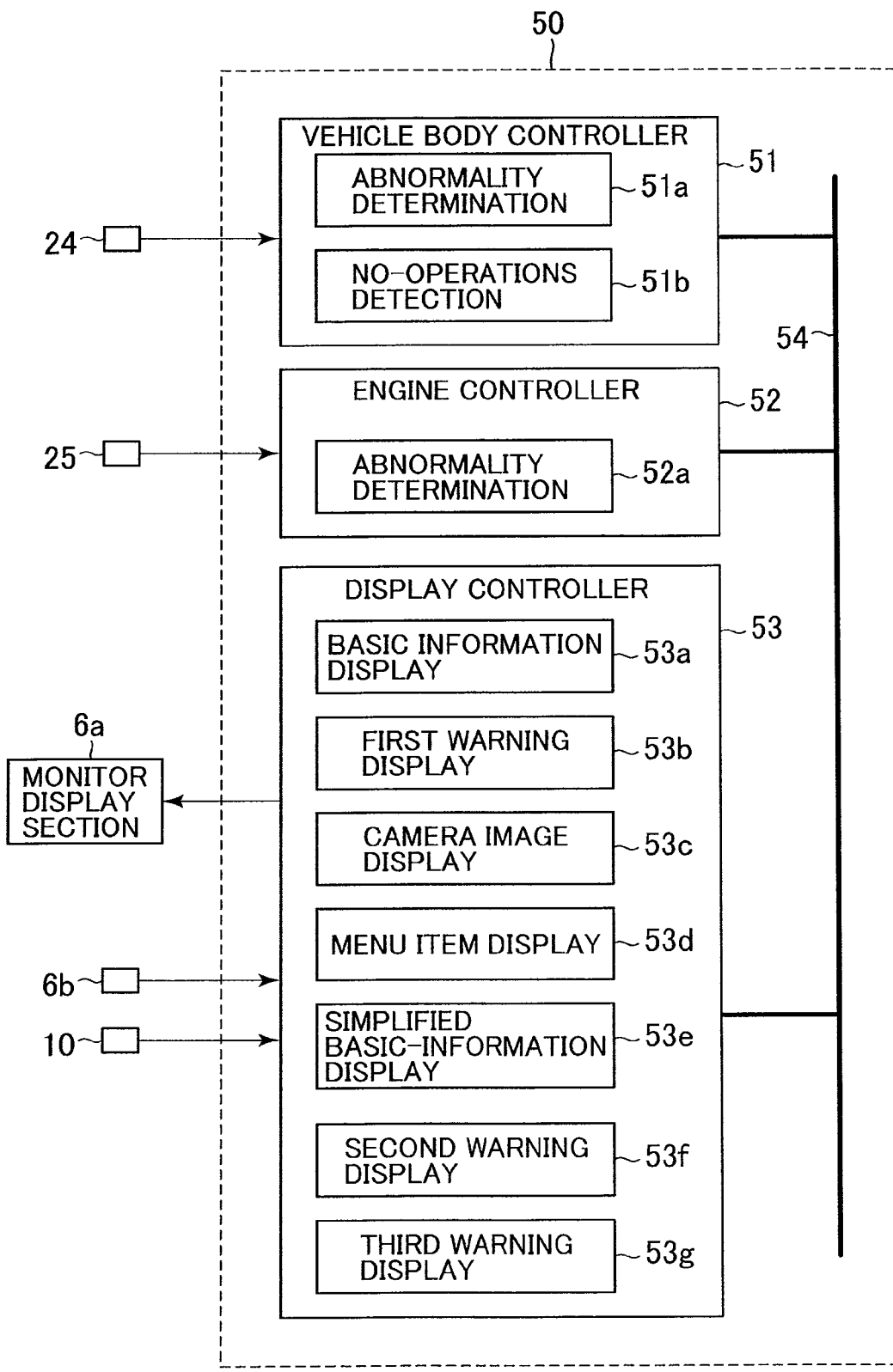
FIG. 4 is a functional block diagram of a control unit.

FIG. 4 is a functional block diagram of the control unit 50. The control unit 50 includes a vehicle body controller 51, an engine controller 52, and a display controller 53, the controllers 51 to 53 being interconnected via a communications line 54 to constitute a vehicle body network.

The vehicle body controller 51 controls the hydraulic driving system. The vehicle body controller 51 receives input signals from various sensors 24 such as a differential pressure sensor 21 provided in the DPF unit 13, and conducts predetermined arithmetic processing based on the signals. For example, the vehicle body controller 51 detects the operating direction and operating stroke of the operating device 7 and controls a tilt angle (capacity) of the hydraulic pump 15 so that the pump delivers the hydraulic fluid at a flow rate based on the operating direction and the operating stroke (see FIG. 3). Additionally, depending on a detection signal from a position sensor provided on the gate lock lever 8, the vehicle body controller 51 detects the lowering position of the lever 8 and switches the control valve 19 to a communicating position to render operable (unlock) the operating device 7, or detects the raising position of the lever 8 and switches the control valve 19 to a cutoff position to render inoperable (lock) the operating device 7. The vehicle body controller 51 further has an abnormality determining function 51a which uses information from each sensor 24 to determine whether an abnormality is occurring. The abnormality determining function 51a also determines an importance level of the abnormality information, based on a previously set table. The vehicle body controller 51 further has a no-operations state detection function 51b which checks a state of the detection signal sent from the position sensor on the gate lock lever 8 and determines whether the gate lock lever is locked. If a pressure signal from the pressure sensor 22 is not detected for a definite time, the no-operations state detection function 51b determines the machine to be in a no-operations state.

The engine controller 52 controls the engine system in accordance with commands from the vehicle body controller 51 and signals from sensors 25 such as an engine speed sensor (not shown). The engine controller 52 has an abnormality determining function 52a, which uses information from the sensors 25 to determine whether an abnormality is occurring. The abnormality determining function 52a also determines an importance level of the abnormality information based on a previously set table.

The display controller 53 receives various signals from the sensors 24 and 25, and arithmetic processing results from the vehicle body controller 51 and the engine controller 52, via a communications line 54. The display controller 53 then sends the received sensor signal/arithmetic processing result information to the monitor 6 as display signals, for displaying the information on the monitor display section 6a.

Functional details of the display controller 53 are described below. The display controller 53 has a basic information display function 53a, a first warning display function 53b, a camera image display function 53c, and a menu item display function 53d. In addition, the display controller 53 has a simplified basic-information display function 53e, a second warning display function 53f, and a third warning display function 53g, as characteristic constituent elements of the controller 53. The latter three functions undertake display control described later.

Figure 5:
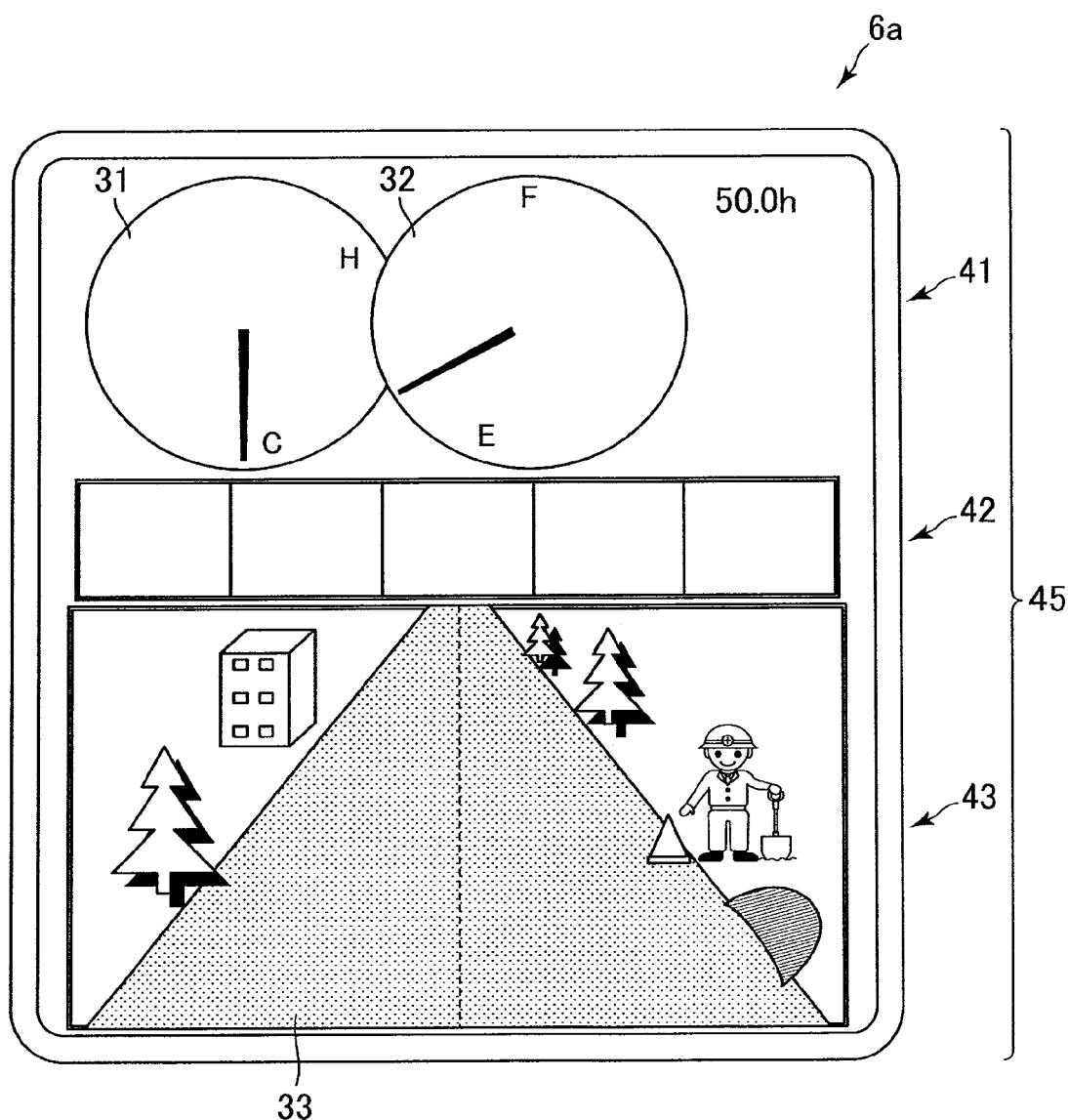
FIG. 5 is an example of a display screen showing a normal vehicle state.

The basic information display function 53a receives various signals that are input from the sensors 24, 25, and displays, in a basic information display region 41, images relating to the basic information from the coolant temperature indicator 31 and the available-fuel level indicator 32 (see FIG. 5). The basic-information images 31 and 32 are displayed as large circle-graph-like indicators so that the operator can readily and easily recognize the indicators.

The first warning display function 53b receives an abnormality information signal that is input from the abnormality determining function 51a or the abnormality determining function 52a via the communications line 54, and displays a warning icon 34 appropriate for the input abnormality information, in a warning icon display region 42 (see FIGS. 6 to 9). The first warning display function can display a plurality of warning icons side by side.

The camera image display function 53c receives an image signal relating to a camera image obtained from the camera 10, and displays the camera image 33 in a camera image display region 43 (see FIG. 5).

The menu item display function 53d receives a switching command that the operator has entered via the monitor-operating section 6b, and displays a menu item screen in an entire region 45 including the basic information display region 41, the warning icon display region 42, and the camera image display region 43. The menu item display function 53d also displays a screen relating to an item selected using a selection command that the operator has entered via the monitor-operating section 6b in the menu item screen. Further detailed description of these displays is omitted herein.

Figure 6:
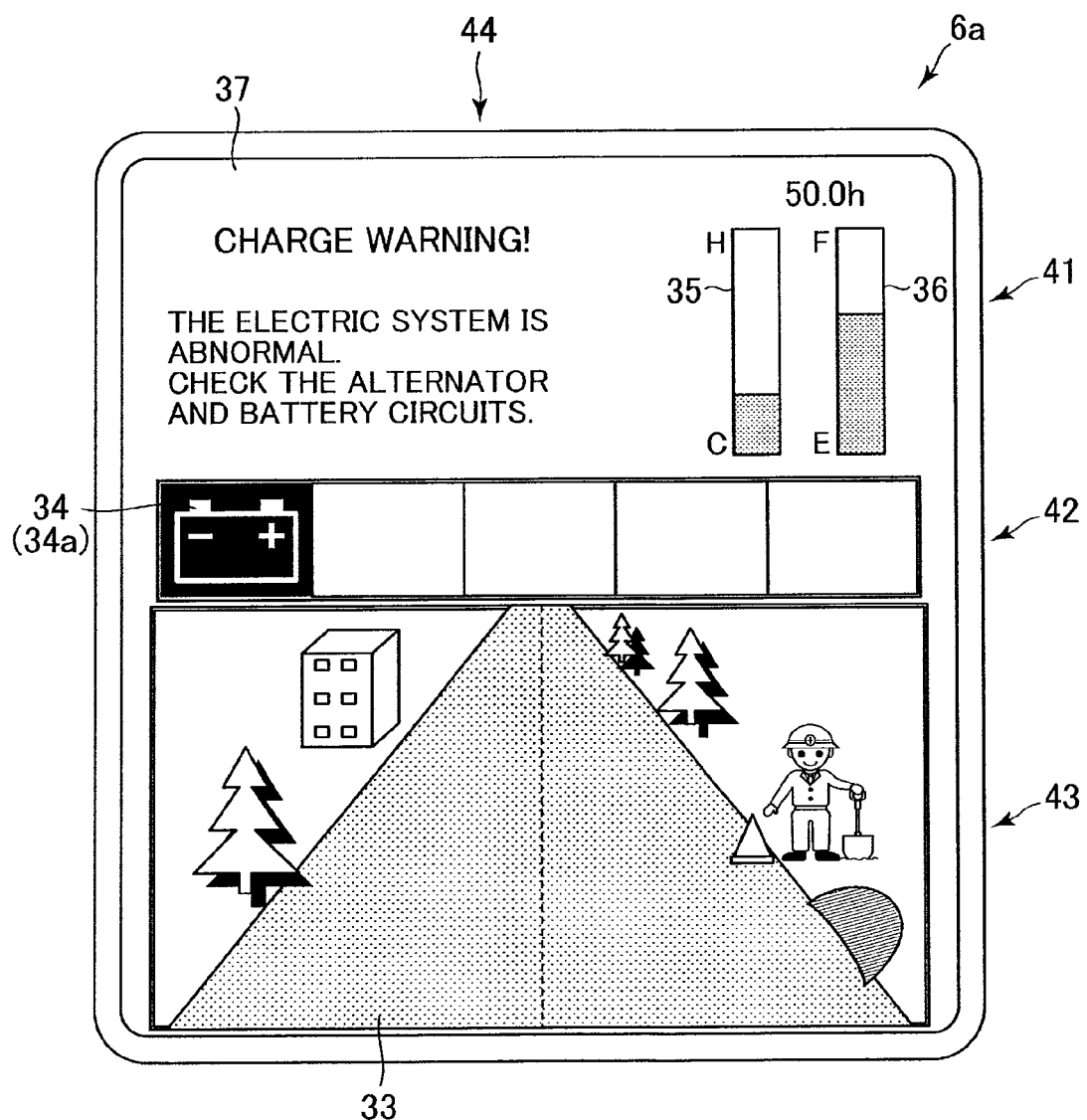
FIG. 6 is a first example of a display screen showing an abnormal vehicle state.
Figure 7:
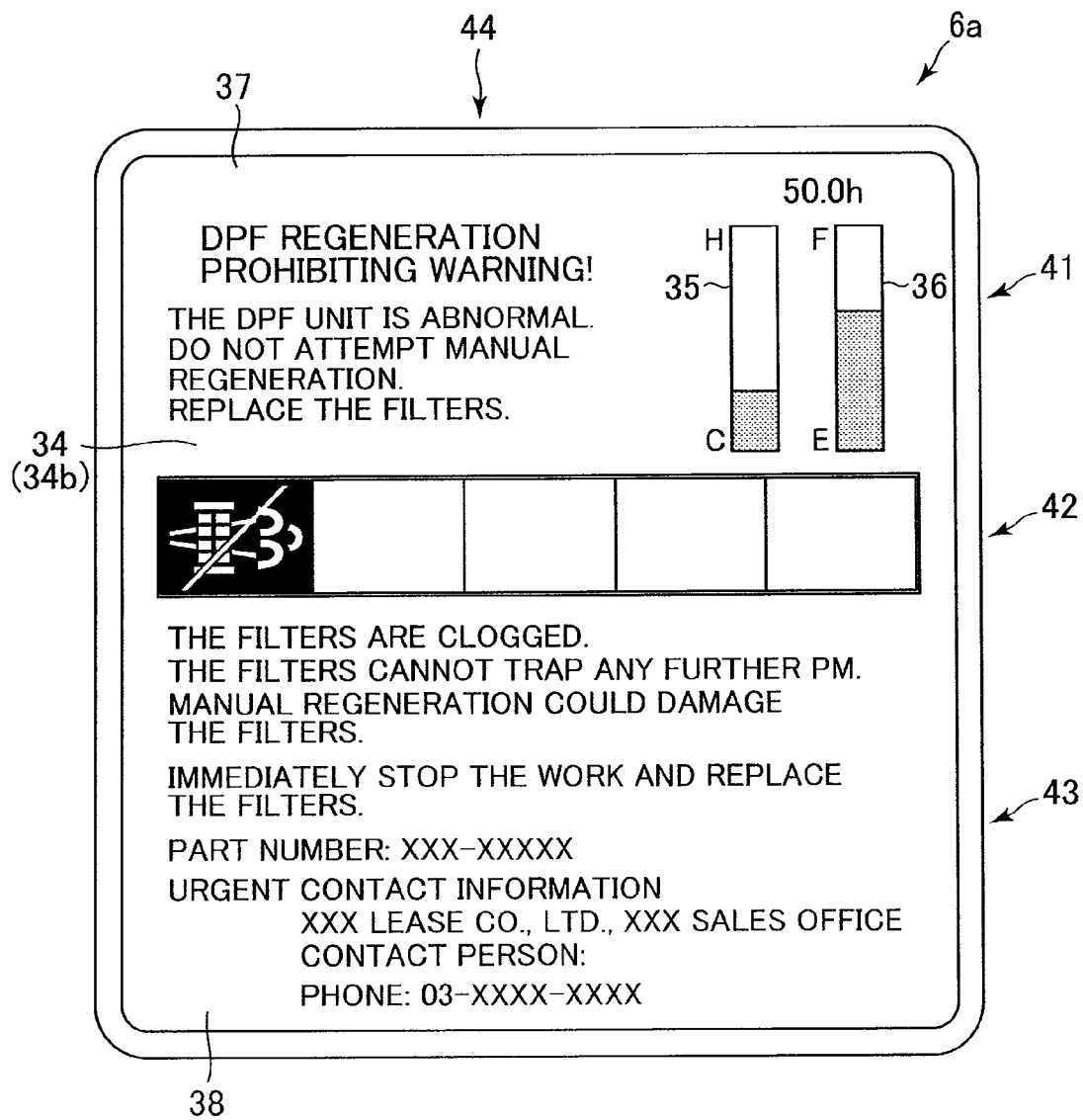
FIG. 7 is a second example of a display screen showing an abnormal vehicle state.
Figure 9:
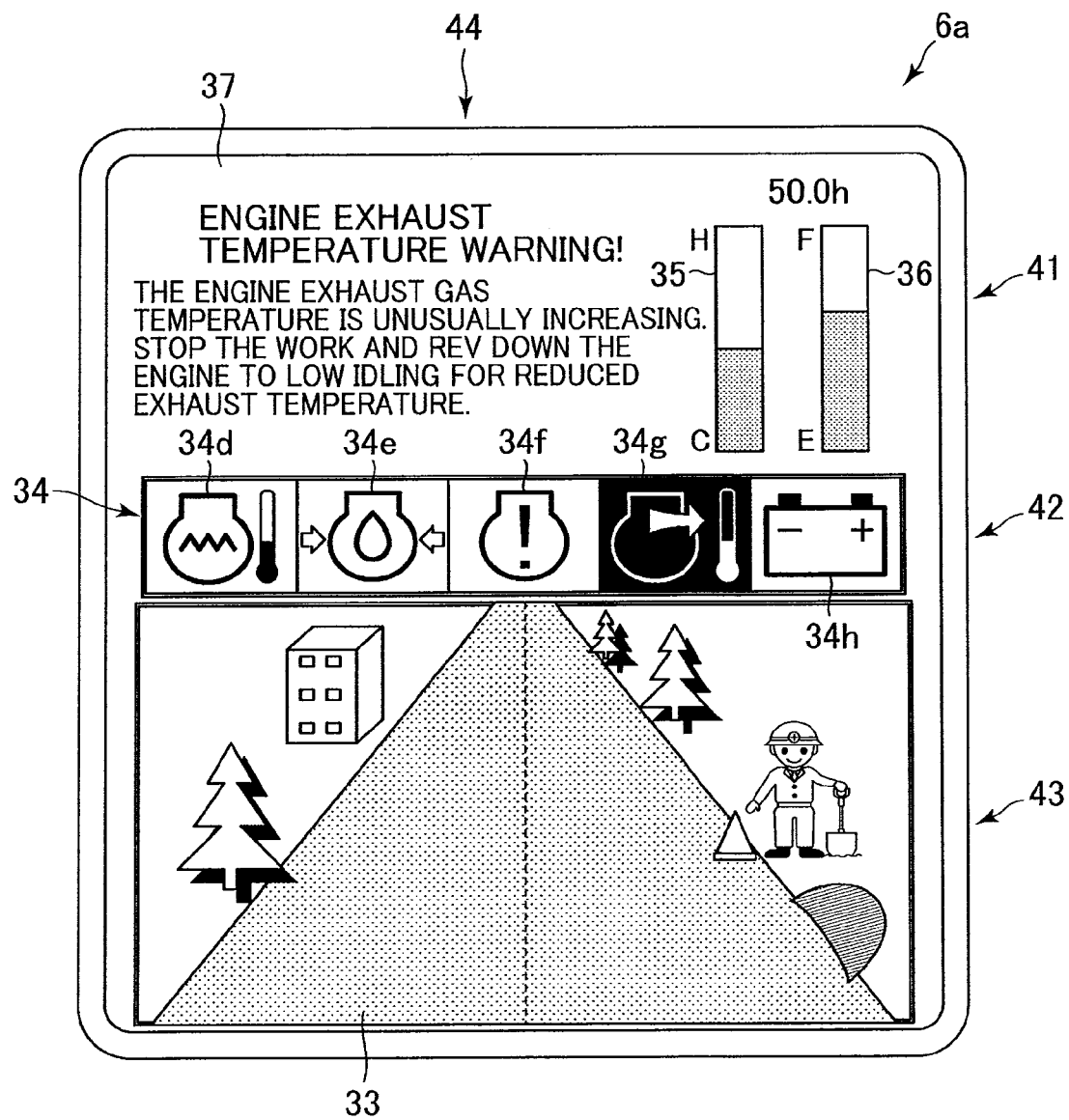
FIG. 9 is a fourth example of a display screen showing an abnormal vehicle state.

The simplified basic-information display function 53e, upon receiving the abnormality information signal, displays simplified basic-information images 35 and 36 instead of the basic-information images 31 and 32 (see FIGS. 6, 7, and 9). The simplified basic-information image 35 is a simplified image of the coolant temperature indicator 31, and the simplified basic-information image 36 is a simplified image of the available-fuel level indicator 32. The simplified basic-information images 35, 36 are smaller than the basic-information images 31, 32, and displayed in a display format different from that of the basic-information images 31, 32, so as to make the basic information easily recognizable despite the smaller size than that of the basic-information images 31, 32. For example, the simplified basic-information images 35, 36 are displayed in a bar-graph format at a right corner of the basic information display region 41.

The second warning display function 53f, upon receiving the abnormality information signal, displays a second warning message 37, which includes the display details of a warning icon 34 and character information describing a simplified remedial action relating to the abnormality information. The display is made in a free (unoccupied) area 44 within the basic information display region 41, the area 44 within the basic information display region 41 corresponding to an area other than an area in which the simplified basic-information images 35, 36 are displayed (see FIGS. 6, 7, 9).

The third warning display function 53g receives the no-operations state detection signal from the no-operations state detection function 51b via the communications line 54. After erasing the camera image 33, the third warning display function 53g displays a third warning message 38 in the camera image display region 43. The third warning message 38 here is information associated with the abnormality information, consisting of further detailed information about the abnormality, a part number of the abnormal machine part, urgent contact information, and other related abnormality information (see FIG. 7).

—Operation—

Operation of the display system will be described using illustrated display screens (FIGS. 5 to 9).

FIG. 5 is an example of a display screen showing a normal vehicle state.

When operation is normal, the coolant temperature indicator 31 and available-fuel level indicator 32 that are the images relating to the basic information indicative of the hydraulic excavator's vehicle body state are displayed in the basic information display region 41 of the monitor display section 6a of the monitor 6, while simultaneously the camera image 33 obtained from the camera 10 is displayed in the camera image region 43. The warning icon display region 42 is blank at this time.

While viewing the coolant temperature indicator 31 and the available-fuel level indicator 32, the operator confirms the vehicle body state, and while viewing the camera image 33, confirms safety of surroundings and performs work such as excavation. At the same time, the operator confirms absence of machine abnormality by the fact that no warning icon 34 is displayed.

FIG. 6 is a first example of a display screen showing an abnormal vehicle state, displaying a charge warning message.

The hydraulic excavator has an electric system. The engine 11, for example, starts operating upon a driving start of a battery-powered starting motor. If the battery voltage is less than a specified level, the driving of the starting motor does not occur and the engine 11 fails to start.

The engine controller 52 receives a signal that is input from a sensor 25, and the abnormality determining function 52a of the engine controller 52 uses the input signal to determine whether an abnormality is occurring. If the abnormality determining function 52a determines that an abnormality is occurring, it outputs an abnormality information signal to the display controller 53 via the communications line 54.

The first warning display function 53b of the display controller 53 receives the abnormality information signal relating to the charge warning, and displays the appropriate warning icon 34a in the warning icon display region 42. The simplified basic-information display function 53e displays the simplified basic-information images 35, 36, instead of the basic-information images 31, 32. A free (unoccupied) area 44 then occurs within the basic information display region 41, the area 44 corresponding to an area other than the area in which the simplified basic-information images 35, 36 are displayed. The second warning display function 53f displays, in the free area 44, a "Charge warning" message (second warning message 37) that includes display details of the warning icon 34a and the character information relating to a simplified remedial action. The display of the camera image 33 continues. In this way, the display controller 53 can display a large volume of information efficiently in a limited display region.

The operator can reliably recognize the "Charge warning" and understand its details as well, by viewing the second warning message 37 in addition to the warning icon 34a. At this time, temporary interruption of basic information display due to automatic switching, troublesome operations associated with manual switching, or other inconvenience is not caused, and inconvenience of basic information display being obstructed by overlapped display is not caused, either.

To confirm the vehicle body state while viewing the simplified coolant-temperature indicator 35 and the simplified fuel-level indicator 36 and check the electric system such as the battery and an alternator, while confirming the safety of surroundings by observing the camera image 33, the operator moves the hydraulic excavator to where his/her work will not interfere with other people's work.

FIG. 7 is a second example of a display screen showing an abnormal vehicle state, displaying a DPF regeneration prohibiting warning.

The DPF unit 13 has filters which trap diesel particulates. The filters become clogged during an extended period of hydraulic excavator usage. Appropriate control of automatic regeneration or appropriate manual regeneration by the operator makes particulates burn off and prevents or minimizes filter clogging. If appropriate regeneration is not conducted, however, accumulation of the particulates continues and the filters become unable to trap further particulates. Regeneration under this state is likely to cause thermal damage to the filters due to abnormal combustion. If the accumulation of the particulates exceeds a limit level, the vehicle body controller 51 determines regeneration to be prohibited, and stops the control of regeneration. The vehicle body controller 51 also outputs an abnormality information signal to the display controller 53 via the communications line 54.

The first warning display function 53b of the display controller 53 receives the abnormality information signal relating to the regeneration prohibiting warning, and displays the appropriate warning icon 34b in the warning icon display region 42. The simplified basic-information display function 53e displays the simplified basic-information images 35, 36, instead of the basic-information images 31, 32. The free (unoccupied) area 44 then occurs within the basic information display region 41, the area 44 corresponding to an area other than the area in which the simplified basic-information images 35, 36 are displayed. The second warning display function 53f displays, in the free area 44, a "DPF regeneration prohibiting warning" message (a second warning message 37) that includes display details of the warning icon 34b and the character information relating to a simplified remedial action.

If the DPF unit 13 cannot trap particulates, since the particulates are directly discharged from the engine 11, the hydraulic excavator becomes substantially unable to perform any further work. In other words, no operations on the hydraulic excavator are substantially underway.

In such a case, the no-operations state detection function 51b determines that the gate lock lever 8 is locked, on the basis of the detection signal from the position sensor provided on the gate lock lever 8, or determines that the pressure signal from the pressure sensor 22 of the operating pilot system is not detected for a definite time. Thus, the no-operations state detection function 51b detects the no-operations state. The third warning display function 53g receives a no-operations state detection signal from the no-operations state detection function 51b via the communications line 54, and after erasing the camera image 33, displays the third warning message 38 in the camera image display region 43. The third warning message 38 here is information associated with the abnormality information, consisting of further detailed information about the DPF regeneration prohibiting warning, a part number of the filters, the urgent contact information, and other related abnormality information.

Although the second warning message 37 is displayed in the free area 44, further information may be preferably displayed as additional information. For example, the operator may wish to confirm what is causing the prohibition of DPF regeneration, and a current situation of the DPF unit. In addition, the operator may wish to confirm a more specific way to replace the filters. However, the free area 44 may dimensionally not suffice for the display of the necessary abnormality information. Since, for this reason, the third warning message 38 is displayed in the camera image region 43, the operator can reliably recognize the cause of the prohibition of DPF regeneration, the current situation of the DPF unit, and a more specific remedial action, by viewing the third warning display 38.

The operator immediately contacts an urgent contact person designated in the third warning message 38 to tell the part number of the filters, and asks for filter replacement.

The camera image 33 is preferably displayed at all times for rearward safety confirmation. If the no-operations state is detected, however, the camera image can be erased since potential hazards associated with safety will not arise in that case.

Figure 8:
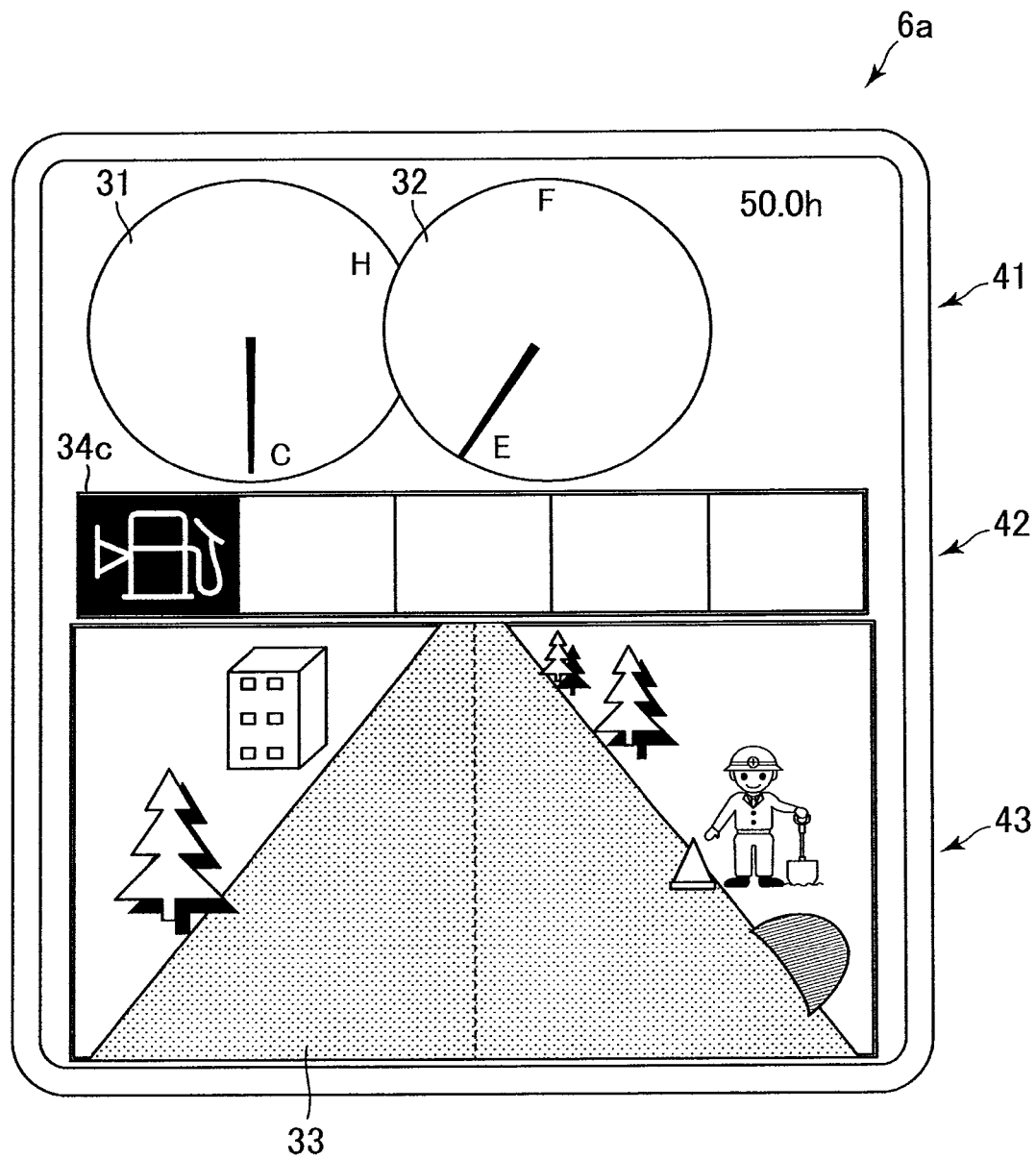
FIG. 8 is a third example of a display screen showing an abnormal vehicle state.

FIG. 8 is a third example of a display screen showing an abnormal vehicle state, displaying an available-fuel level warning.

The operator can confirm a residual available amount of fuel at all times by viewing the available-fuel level indicator 32. A warning icon 34c corresponding to the available-fuel level warning is frequently displayed, which allows the operator to recognize the available-fuel level warning just by having a look at the warning icon 34c, so no further information is necessary. On the other hand, the operator might feel the frequent display switching (the basic-information images 31, 32 to the simplified basic-information images 35, 36) bothersome.

The abnormality determining function 51a also determines the importance level of the abnormality information based on the previously set table. For example, the abnormality determining function 51a determines that the importance level of the available-fuel level warning is low.

The first warning display function 53b of the display controller 53 receives the abnormality information signal relating to the available-fuel level warning, and displays the appropriate warning icon 34c in the warning icon display region 42. If the abnormality is determined to be minor, the simplified basic-information display function 53e and the second warning display function 53f do not operate and the display of the basic-information images 31, 32 continues. This releases the operator from the troublesomeness of display switching.

In the first and second examples, the abnormality determining functions 51a, 52a determine that the importance level of the abnormality information is high, and the simplified basic-information display function 53e and the second warning display function 53f operate, but detailed description of these facts is omitted.

FIG. 9 is a fourth example of a display screen showing an abnormal vehicle state, displaying a plurality of warnings.

The constituent elements of the hydraulic excavator are controlled via the communications line 54, so that the elements affect one another, which means that the abnormality determining functions 51a, 52a are likely to output a plurality of sets of abnormality information to the display controller 53 via the communications line 54. Each of the abnormality determining functions 51a, 52a also has an importance level determining function, and information relating to an importance level is added to the abnormality information.

The first warning display function 53b of the display controller 53 receives a plurality of abnormality information signals and then displays appropriate warning icons 34d to 34h in the warning icon display region 42. The warning icons 34d to 34h have respective levels of priority predefined according to the level of importance and are arranged in order from left with the one of the highest priority first. The simplified basic-information display function 53e displays the simplified basic-information images 35, 36, instead of the basic-information images 31, 32. The free (unoccupied) area 44 then occurs within the basic information display region 41, the area 44 corresponding to an area other than the area in which the simplified basic-information images 35, 36 are displayed.

The second warning display function 53f initially displays, in the free area 44, an "Overheating warning" message that contains display details of the warning icon 34d having the highest priority level, and the character information relating to a simplified remedial action.

As the operator rotates the rotary switch (the monitor-operating section 6b), a cursor for reverse display of a warning icon moves, allowing the operator to select a desired warning icon. For example, the operator selects a warning icon 34g by pressing the rotary switch after moving the cursor to the warning icon 34g.

The second warning display function 53f displays, in the free area 44, an "Engine exhaust temperature warning" message (second warning message 37) that includes display details of the selected warning icon 34g and the character information relating to a simplified remedial action. This allows the operator to understand the details and the like of the desired warning icon, even when a plurality of warning icons 34 are displayed.

—Effects—

(1) The prior art has had the following problems. That is to say, warning icons are effective in that they are displayed in a narrow display region so that an operator can intuitively recognize each warning icon, but merely by looking at the warning icon, the operator will not necessarily be able to understand details of the icon, that is, what the icon means. To make the meaning of the warning icon understandable, therefore, it is necessary to display the character information relating to the details of the icon. At this time, there are tendencies for automatic switching display to make the operator unable to confirm basic information in his/her desired timing, for manual switching display to cause troublesomeness associated with operations, and for overlapped display to impair the operator's visibility of the basic information.

In the present invention, as opposed to the above, the display controller 53 displays, in the free area 44, a second warning message 37 that includes the display details of a warning icon 34 and the character information relating to a simplified remedial action. By viewing the warning message 37 in addition to the warning icon 34, therefore, the operator can reliably recognize the existence of the warning information and understand the display details of this information as well. At this time, the present invention does not cause temporary interruption of the basic information display due to automatic switching, the troublesomeness associated with manual switching operations, or the impairment of the operator's visibility of the basic information due to overlapped display.

For these reasons, the display system can display the basic information at all times, and in case of an abnormality, can display the details of a warning in addition to the basic information in such a form as to enable the operator to reliably recognize the details of the warning.

(2) It may be preferable that further information be displayed in addition to the second warning message 37. The free area 44, however, may dimensionally not suffice for that display.

In the present invention, as opposed to the above, the display controller 53 displays the third warning message 38 as the information associated with the second warning message 37, in the camera image region 43. The operator can recognize the existence of the warning information more reliably by viewing the third warning message 38. In addition, since the vehicle body controller 51 detects the no-operations state, the camera image 33 can be erased while ensuring the safety of surroundings.

(3) Since the display controller 53 displays the second warning message 37 in the free area 44 and the third warning message 38 in the camera image region 43, a great deal of information can be displayed efficiently in a limited display region.

In this way, the display system can display the basic information at all times, and in case of an abnormality, can display the details of a warning in addition to the basic information efficiently and in such a form as to enable the operator to reliably recognize the details of the warning.

—Modifications—

(1) A modification of the present embodiment includes the camera image display region 43 for displaying the camera image 33, the camera image display function 53c, the no-operations state detection function 51b, and the third warning display function 53g, and the embodiment preferably includes at least these elements. However, these elements are not absolutely necessary.

Figure 10:
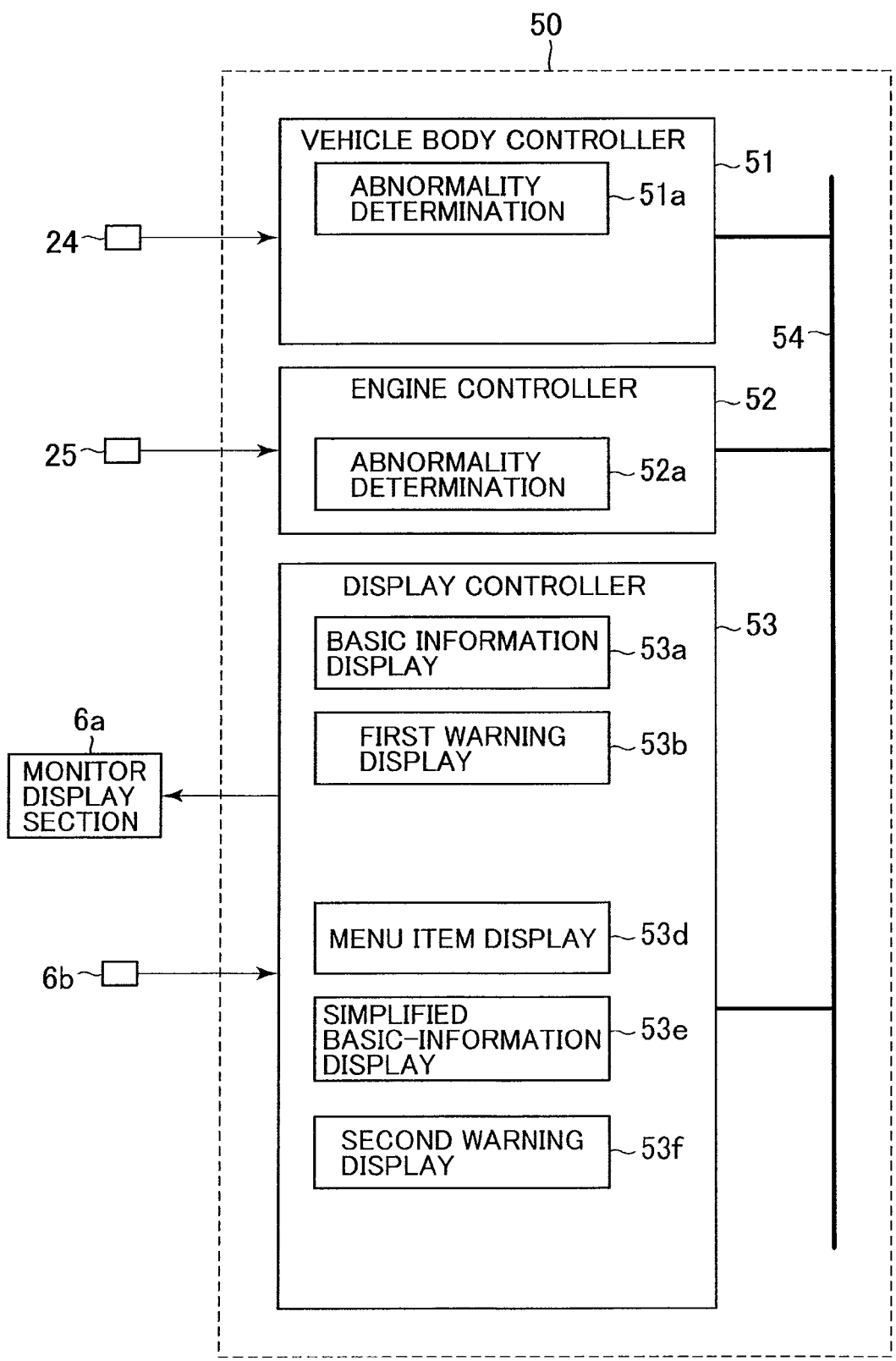
FIG. 10 is a functional block diagram showing a modification of the control unit.
Figure 11:
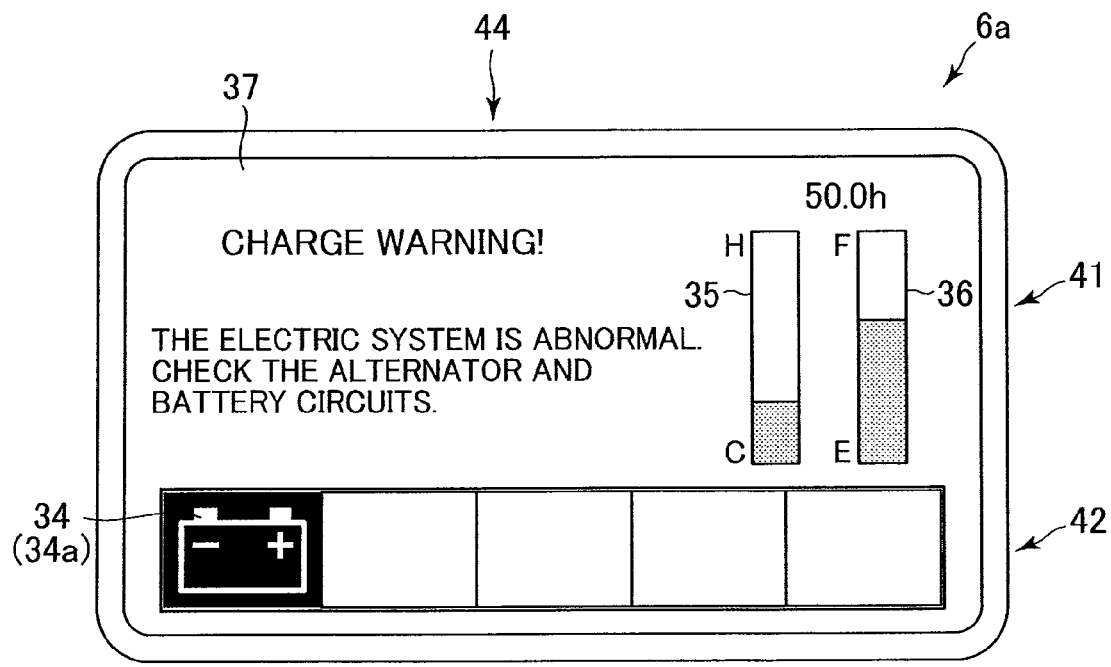
FIG. 11 is an example (modification) of a display screen showing an abnormal vehicle state.

FIG. 10 is a functional block diagram showing the control unit 50 according to the present modification. FIG. 11 is an example of a display screen showing an abnormal vehicle state.

The first warning display function 53b of the display controller 53 displays the warning icon 34a in the warning icon display region 42. The free area 44 occurs as a result of the simplified basic-information display function 53e displaying the simplified basic-information images 35, 36. The second warning display function 53f displays second warning message 37 in the free area 44.

This yields substantially the same effects as those obtained in the first and third examples.

(2) In the present embodiment, when the abnormality relating to an abnormality detection signal is minor, the simplified basic-information display function 53e and the second warning display function 53f do not operate (see FIG. 8). However, the simplified basic-information display function 53e and the second warning display function 53f may be made to operate, irrespective of whether the abnormality is minor. Substantially the same effects as in the first to third examples can also be obtained in the present modification.

DESCRIPTION OF REFERENCE NUMBERS

1 Lower track structure
2 Upper swing structure
3 Front working implement
4 Cabin
5 Driver's seat
6 Monitor
6a Monitor display section
6b Monitor-operating section (Rotary switch)
7 Operating device
8 Gate lock lever
10 Camera
11 Engine
12 Fuel injector
13 DPF unit
14 Regenerative fuel injector
15 Hydraulic pump
16 Control valve
17 Hydraulic actuator
18 Pilot pump
19 Control valve
20 Shuttle valve
21 Differential pressure sensor
22 Pressure sensor
24, 25 Sensors
31 Coolant temperature indicator (Basic-information image)
32 Available-fuel level indicator (Basic-information image)
33 Camera image
34 Warning icon
35 Simplified coolant temperature indicator (Simplified basic-information image)
36 Simplified available-fuel level indicator (Simplified basic-information image)
37 Second warning message
38 Third warning message
41 Basic information display region
42 Warning icon display region
43 Camera image region
44 Free (unoccupied) area
45 Entire region
50 Control unit
51 Vehicle body controller
51a Abnormality determining function
51b No-operations state detection function
52 Engine controller
52a Abnormality determining function
53 Display controller
53a Basic information display function
53b First warning display function
53c Camera image display function
53d Menu item display function
53e Simplified basic-information display function
53f Second warning display function
53g Third warning display function
54 Communications line

The invention claimed is:
1. A display system for a working machine, comprising:
a monitor (6, 6a) including a basic information display region (41) for displaying images (31, 32) relating to basic information on the working machine, and a warning icon display region (42) for displaying a warning icon (34); and
a display controller (53) having a basic information display function (53a) for displaying the images relating to the basic information, and a first warning display function (53b) for displaying the warning icon;
wherein the display controller further comprises:
a simplified basic-information display function (53e) using a predetermined signal to newly display, instead of the images relating to the basic information, simplified basic-information images (35, 36) smaller than the basic-information images; and
a second warning display function (53f) for displaying warning information (37) inclusive of display details of the warning icon, in an area (44) within the basic information display region, the area (44) within the basic information display region corresponding to an area other than an area in which the simplified basic-information images are displayed.

2. The display system for a working machine according to claim 1, further comprising:
abnormality detection means (24, 25, 51a, 52a) for detecting an abnormality of the working machine;
wherein the predetermined signal is an abnormality detection signal obtained from the abnormality detection means.

3. The display system for a working machine according to claim 2, further comprising:
importance level determining means (51a, 52a) for determining an importance level of the abnormality relating to the abnormality detection signal;
wherein the simplified basic-information display function (53e) and the second warning display function (53f) operate if the abnormality relating to the abnormality detection signal is serious.

4. The display system for a working machine according to claim 1, further comprising:
a camera (10) for acquiring an image of the periphery of the working machine; wherein:
the monitor further includes a camera image display region (43) for displaying the camera image (33) obtained from the camera; and
the display controller further has a camera image display function (53c).

5. The display system for a working machine according to claim 4, further comprising:
no-operations state detection means (8, 22, 51b) for detecting a no-operations state of the working machine;
wherein the display controller further has a third warning display function (53g) for displaying, in the camera image display region (43), information (38) based upon a no-operations state detection signal obtained from the no-operations state detection means, the information (38) being pertinent to the warning information.

6. The display system for a working machine according to claim 1, wherein:
the warning icon display region (42) is adapted to display a plurality of warning icons (34a to 34h); and
the first warning display function (53b) displays each of the plurality of warning icons, side by side, according to the level of importance.

7. The display system for a working machine according to claim 6, further comprising:
a rotary switch (6b) for selecting a warning icon by rotation and determining the selected warning icon upon the switch being pressed;

wherein the second warning display function (53*f*) displays the warning information (37) including the display details of the warning icon determined using the rotary switch.

\* \* \* \* \*